United States Patent
Kim et al.

(10) Patent No.: US 9,413,958 B2
(45) Date of Patent: Aug. 9, 2016

(54) METHOD AND APPARATUS FOR DRIVING CAMERA

(71) Applicant: Samsung Electronics Co., Ltd., Gyeonggi-do (KR)

(72) Inventors: Pyo-Jae Kim, Gyeonggi-do (KR); Young-Kwon Yoon, Seoul (KR); Yong-Gu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/543,263

(22) Filed: Nov. 17, 2014

(65) Prior Publication Data

US 2015/0070571 A1    Mar. 12, 2015

Related U.S. Application Data

(63) Continuation of application No. 12/982,399, filed on Dec. 30, 2010, now Pat. No. 8,891,004.

(30) Foreign Application Priority Data

Dec. 30, 2009  (KR) .................... 10-2009-0134816

(51) Int. Cl.
*H04N 5/232* (2006.01)

(52) U.S. Cl.
CPC ........... *H04N 5/23241* (2013.01); *H04N 5/232* (2013.01); *H04N 5/23245* (2013.01); *H04N 5/23293* (2013.01)

(58) Field of Classification Search
CPC   H04N 5/23241; H04N 5/232; H04N 5/23293
See application file for complete search history.

(56) References Cited

U.S. PATENT DOCUMENTS

| | | | | |
|---|---|---|---|---|
| 7,453,515 | B2 * | 11/2008 | Mizobuchi | H04N 1/215 348/220.1 |
| 7,542,092 | B2 * | 6/2009 | Ohsawa | H04N 5/232 348/222.1 |
| 7,695,309 | B2 * | 4/2010 | Craig | H05K 7/186 439/489 |
| 7,965,309 | B2 | 6/2011 | Mattila et al. | |
| 2004/0027466 | A1 | 2/2004 | Mizobuchi | |
| 2005/0219406 | A1 * | 10/2005 | Ohsawa | 348/372 |
| 2008/0068447 | A1 * | 3/2008 | Mattila et al. | 348/14.08 |

FOREIGN PATENT DOCUMENTS

| | | |
|---|---|---|
| JP | 2000-232604 | 8/2000 |
| JP | 2001-320626 | 11/2001 |
| KR | 1020080108709 | 12/2008 |

* cited by examiner

*Primary Examiner* — Ahmed A Berhan
(74) *Attorney, Agent, or Firm* — The Farrell Law Firm, P.C.

(57) ABSTRACT

A method and an apparatus are provided in which an image sensor, operatively coupled with an electronic device, is operated in a first state based on a determination that the image sensor is to be operated in a low power mode. When the image sensor is operating in the first state, a setup value corresponding to a photographing mode is preserved, and the image sensor is refrained from outputting a stream of data.

17 Claims, 4 Drawing Sheets

METHOD AND APPARATUS FOR DRIVING CAMERA

PRIORITY

This application is a Continuation Application of U.S. application Ser. No. 12/982,399, filed on Dec. 30, 2010, which claims priority to an application entitled "Method and Apparatus for Driving Camera" filed in the Korean Industrial Property Office on Dec. 30, 2009 and assigned Serial No. 10-2009-0134816, the contents of which are incorporated herein by reference.

BACKGROUND OF THE INVENTION

1. Field of the Invention

The present invention relates generally to a digital camera, and more particularly, to a method and apparatus which enables the digital camera to be rapidly driven while maintaining low power consumption.

2. Description of the Related Art

Modern mobile terminals are multi-functional. For example, a cellular phone provides voice communication as well as a plurality of additional functions, such as Near Field Communication (NFC), music file reproduction, Digital Multimedia Broadcasting (DMB) service reception, and image photographing. While it has been possible for one mobile terminal to provide various functions, as described above, an active power control is required due to the inherent increased power consumption.

In order to efficiently manage power, a mobile terminal having a camera function shifts to a photographing standby state when a photographing request is not input for a period of time when a photographing mode is set. In the photographing standby state, Auto Exposure (AE) and Auto White Balance (AWB) are not performed, or a fine adjustment of a lens motor for Auto Focus (AF) is forbidden, in order to reduce power consumption. Thereafter, either when a photographing request continues not to be input, or when a user input connected with a camera is not sensed, the photographing mode is automatically terminated or the output of a display screen is stopped. Accordingly, power applied to an image sensor is interrupted, and loading of a camera application program is canceled.

When it is necessary to store an image obtained through photographing, or to perform a specific function in a photographing activation state, the mobile terminal shifts to the standby state, and returns to the photographing activation state after the specific function has been completed. For example, although a cellular phone is in a photographing activation state, where all components connected with an image photographing function are activated, the cellular phone preferentially performs an operation, such as communication or message checking, when receiving a call or text message. In this case, a photographing mode is terminated or shifts to a standby state. When the photographing shifts to the standby state, the cellular phone returns to the photographing activation mode when the communication has been terminated or when the message has been checked. However, when the standby time becomes longer than a given period of time, the photographing mode is completely terminated.

When a photographing mode is set in a mobile terminal, the time required for shifting to an activation state is one second to two seconds, a procedure of which is shown in FIG. 1. Referring to FIG. 1, in order to activate a camera function in response to a photographing mode setup request of the user, the mobile terminal drives an image sensor by applying power to the image sensor, and loads a photographing program into a memory. Then, the mobile terminal initializes the image sensor, and sets the image sensor according various camera setup values, such as initialization of a zoom function, image size, ISO, and exposure time, and shifts to an activation state where it is possible to directly perform an image photographing in response to a photographing key input or the like.

Of the aforementioned power management schemes, the scheme of terminating the photographing mode or interrupting the output of the display unit in the mobile terminal when a period of time has elapsed has a problem in that the user cannot actively use the low power function of the camera.

In addition, only AF, AE, and AWB functions are interrupted in the standby state, which only minimally reduces power consumption.

Also, when the photographing standby period of time is lengthened due to another cause, such as call incoming, and thus the photographing mode is terminated, the user will probably desire to again set the photographing mode and to enter the activation state. However, since the photographing mode has already been terminated, it is possible to momentarily set the activation state, rendering it necessary to reset the photographing mode step by step from the beginning based on a procedure, as shown in FIG. 1. In this case, a waiting time of the user increases, so that the user may miss an opportunity to photograph a desired scene.

SUMMARY OF THE INVENTION

Accordingly, the present invention has been made to solve the above-mentioned problems occurring in the prior art, and the present invention provides a camera driving method and apparatus which can rapidly take a photograph while maintaining low power consumption when a photographing mode is set in a mobile terminal.

Also, the present invention provides a camera driving method and apparatus which implements a low power standby state which can be actively selected by the user, thereby enabling the camera to be rapidly driven.

In addition, the present invention provides a camera driving method and apparatus which can maintain a standby state for a long time by driving the camera with low power.

In accordance with an aspect of the present invention, a method is provided in which an image sensor, operatively coupled with an electronic device, is operated in a first state based on a determination that the image sensor is to be operated in a low power mode. When the image sensor is operating in the first state, a setup value corresponding to a photographing mode is preserved, and the image sensor is refrained from outputting a stream of data.

In accordance with another aspect of the present invention, an apparatus is provided, which includes an image sensor and a display operatively coupled with the apparatus. The apparatus also includes a controller operatively coupled with the apparatus. The controller is configured to operate an image sensor in a first state based on a determination that the image sensor is to be operated in a low power mode, and when the image sensor is operating in the first state, preserve a setup value corresponding to a photographing mode, and refrain from outputting a stream of data from the image sensor.

In accordance with a further aspect of the present invention, a machine-readable storage device is provided that stores instructions that, when executed by one or more processors, cause the one or more processors to perform operations including: operating an image sensor, operatively coupled with an electronic device, in a first state based on a determination that the image sensor is to be operated in a low power mode; and when the image sensor is operating in the first state: preserving a setup value corresponding to a photographing mode, and refraining from outputting a stream of data from the image sensor.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
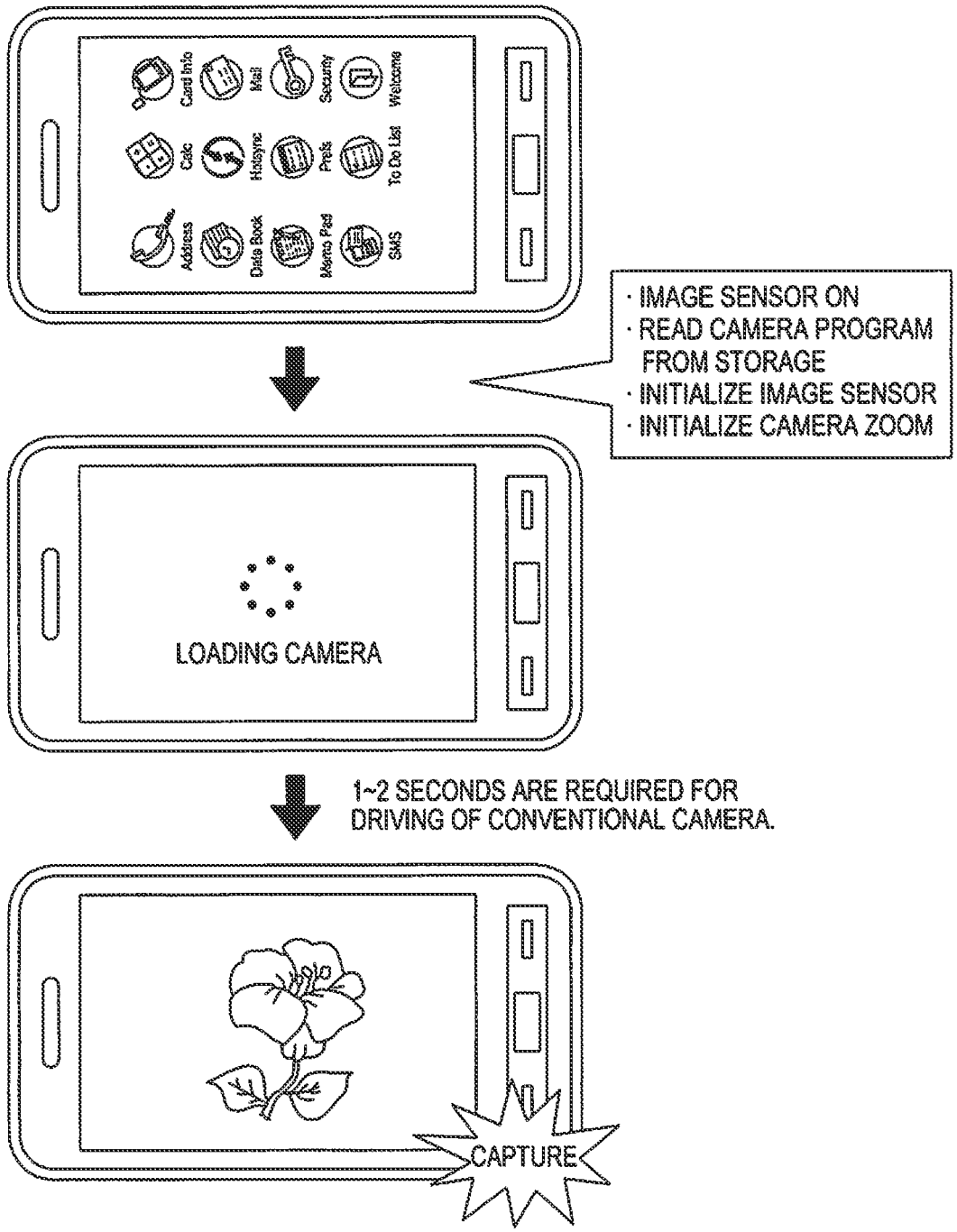
FIG. 1 illustrates a conventional camera driving procedure.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention discloses a camera driving method which can rapidly drive a camera in response to a photographing request while maintaining a low power standby mode with low power consumption. Thus, when a low power standby mode is set, an image sensor shifts to a software standby state, and either an output of a display unit is changed to a null image of block color and then is output at a minimum Frame per Second (FPS), or a camera application program shifts into a background under an operating system supporting a multitasking function. The software standby state of the image sensor indicates a state just prior to a streaming output after initialization of the image sensor and setting of various setup values corresponding to the photographing mode have been completed. That is, in the software standby state, the image sensor does not generate a stream output of sensed data.

According to an embodiment of the present invention, when a request to shift to an activation mode is input when the low-power standby mode is set, the image sensor can immediately perform a streaming output of sensed data, so that it is possible to provide a preview screen within a short period of time and to take a photograph.

As described above, according to an embodiment of the present invention, the image sensor in the low power standby mode is maintained in the software standby mode, and a null image of black color is output at a low Frames Per Second (FPS) on a display screen, thereby reducing power consumption. At the same time, the initialization state of the image sensor and an image processing activation state are maintained, so that it is possible to rapidly operate the camera.

Figure 2:
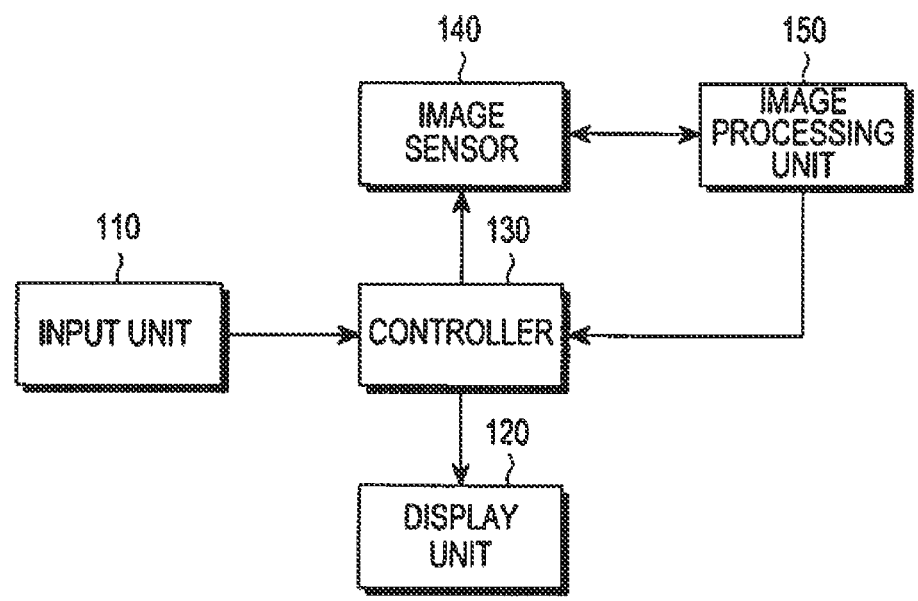
FIG. 2 illustrates the configuration of a mobile terminal according to an embodiment of the present invention.

The configuration of a mobile terminal, to which the aforementioned method is applied, is shown in FIG. 2, which illustrates the configuration of a mobile terminal according to an embodiment of the present invention. Referring to FIG. 2, the mobile terminal includes an input unit 110, a display unit 120, a controller 130, an image sensor 140, and an image processing unit 150.

The input unit 110 may include various input means, such as a keypad and a touch screen, wherein the user may input a photographing-mode setup request or may select a camera driving scheme through the input unit 110.

The display unit 120 displays various images or data under the control of the controller 130. The display unit 120 may be implemented with a Liquid Crystal Display (LCD).

The controller 130 controls the overall operation of the mobile terminal, such as the driving of a camera application program, and the operations of the image sensor 140, the image processing unit 150, and the screen of the display unit 120. The controller 130 may be implemented with a microprocessor, a Digital Signal Processor (DSP), etc., and includes an additional device, such as a memory, required for operation control.

The image processing unit 150 processes a sensed value acquired by the image sensor 140, thereby processing and outputting an image to the controller 130.

The image sensor 140 forms an image on an arrangement of Metal Oxide Semiconductor (MOS) transistor or Charge-Coupled Device (CCD) memory, electronically scans an output of each cell (which is the minimum unit circuit element), converts the image into an electrical signal, and outputs the electrical signal to the image processing unit 150.

Figure 3:
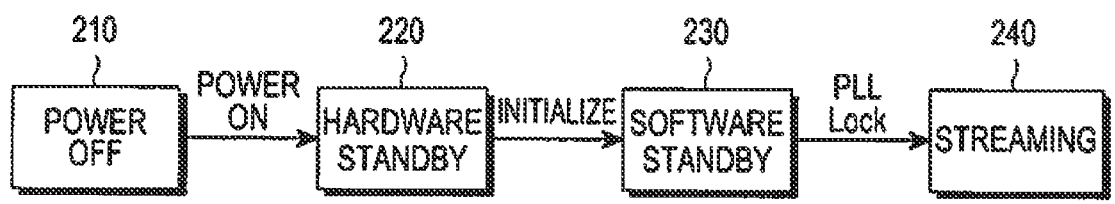
FIG. 3 explains the system states of an image sensor according to an embodiment of the present invention.

FIG. 3 explains four system states of the image sensor 140. Referring to FIG. 3, the image sensor 140 may have a power-off state 210, a hardware standby state 220, a software standby state 230, and a streaming state 240. When a photographing mode is not set, the image sensor 140 is maintained in the power-off state 210. When power is applied according to the execution of a camera application program in the power-off state 210, the image sensor 140 shifts to the hardware standby state 220, wherein when a system initialization process and setting based on a camera photographing setup value have been completed, the image sensor 140 shifts to the software standby state 230.

The camera setup value is for determining the size and quality of an image generated according to actual photographing, and includes, for example, a gray or Red, Green, Blue (RGB) scale, ISO, and exposure time. In the software standby state 230, when a Phase-Locked Loop (PLL) lock process of applying an operation clock for the image sensor 140, the image sensor 140 shifts to the streaming state 240, in which the image sensor 140 outputs an image of a subject to the image processing unit 150. Among these states, in the software standby state 230, power is consumed in microamperes with the setting according to the camera setup value maintained. Therefore, according to an embodiment of the present invention, in a low power standby mode, the image sensor 140 is maintained in the software standby state.

Figure 4:
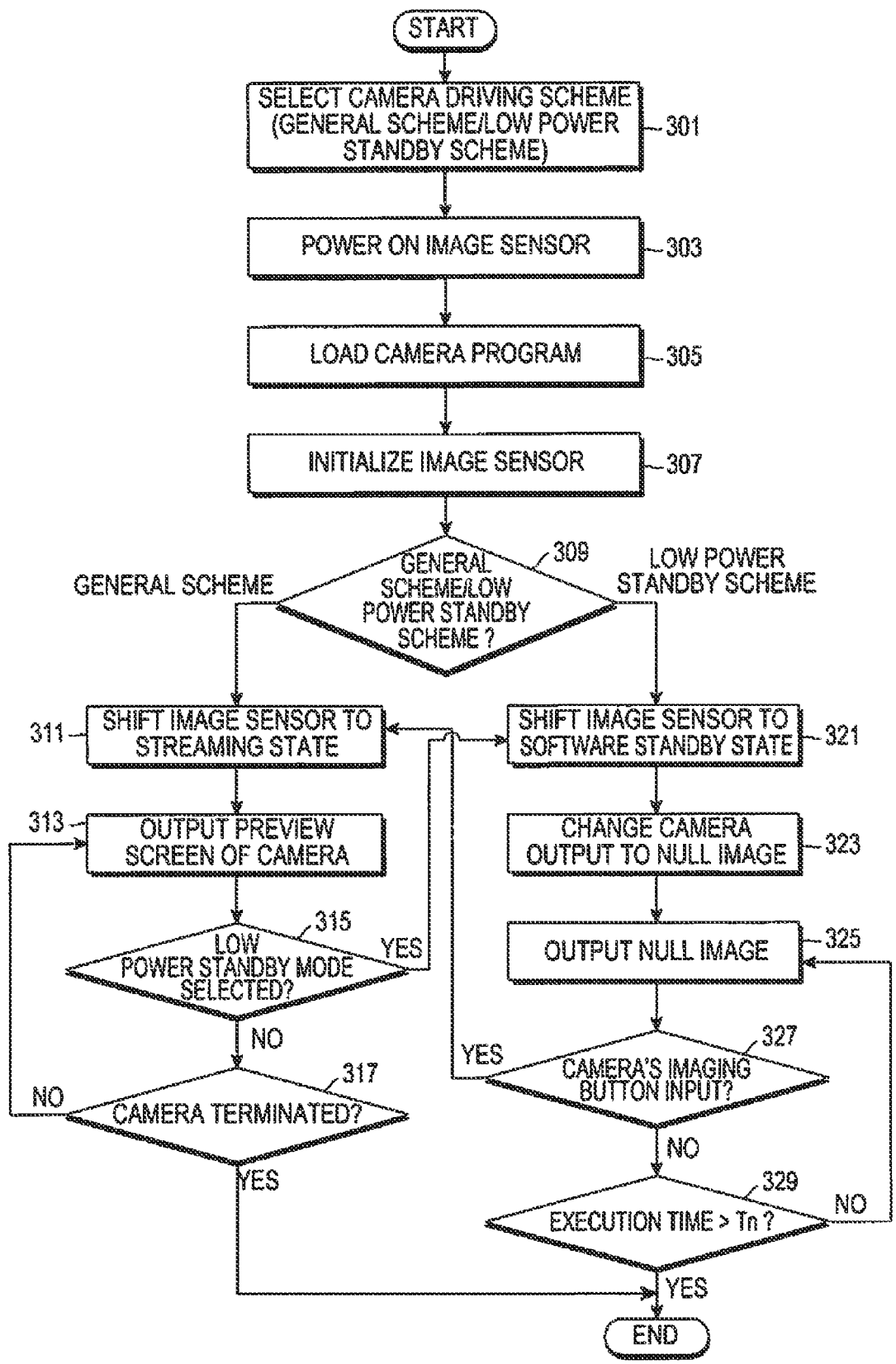
FIG. 4 illustrates the operation procedure of the mobile terminal according to an embodiment of the present invention.

FIG. 4 illustrates the operation procedure of the mobile terminal according to an embodiment of the present invention.

Before a camera function is activated, the user of the mobile terminal can select either a general mode or a low power mode as a camera's operating mode through the input unit 110. The general mode corresponds to the conventional operating mode of the camera, and the low power mode corresponds to a camera's operating mode according to an embodiment of the present invention. Accordingly, in step 301, the controller 130 stores an operating mode selected by the user.

When a camera function execution request is input by the user, the controller 130 powers on the image sensor 140 by applying power to the image sensor 140 in step 303. Thereafter, the controller 130 loads a camera application program into a memory of the controller 130 in step 305, and then proceeds to step 307 in which the controller 130 performs the initialization of the image sensor 140, and sets the image sensor 140 according to various setup values for camera photographing when completing the initialization, so that the image sensor 140 shifts to the software standby state 230.

In step 309, the controller 130 controls the state of the image sensor 140 and the operation of the camera according to the camera's operating mode selected in step 301.

First, when the camera's operating mode to be executed in a low power standby scheme is selected by the user, the controller 130 maintains the image sensor 140 in the software standby state 230 in step 321. In step 323, controller 130 controls the image processing unit 150 to change the output of the image processing unit 150 to a black null image, and proceeds to step 325, where the controller 130 outputs the null image at a low FPS through the display unit 120, in the manner of a preview screen. When the mobile terminal has a multitasking function, the controller 130 may execute the camera application program as a background processor in step 325, instead of outputting the null image. Through such a procedure, the camera operates in a low power standby mode.

When the user presses a camera's imaging button to photograph an image in the low power standby mode, the controller 130 senses the input of the camera's imaging button in step 327, and proceeds to step 311, where a shift is performed to the general mode. Then, an image is photographed and output through the display unit 120. When there is no input of the imaging button, the controller 130 checks a continuous period of time during which the low power standby mode is maintained in step 329. The controller 130 terminates the camera application program when the continuous period of time is greater than a threshold value "Tn," and is maintained in the low power standby mode when the continuous period of time is equal to or less than a threshold value "Tn." Step 329 is performed to prevent excessive power consumption due to a long standby mode.

When the camera's operating mode to be executed in a general mode is selected by the user, the controller 130 shifts the image sensor 140 to the streaming state 240 in step 311, and outputs a preview screen in step 313 by outputting an image processed by the image processing unit 150 to the display unit 120. Even when the preview screen is output, when the user selects the low power standby mode through the input unit 110 in step 315, the controller 130 proceeds to step 321, where the controller 130 shifts the image sensor 140 from the streaming state 240 to the software standby state 230, and then performs steps 323 to 329 described above.

When the user selects termination of the camera function in step 317, the camera function is terminated in the same procedure as a general camera program termination procedure.

Figure 5:
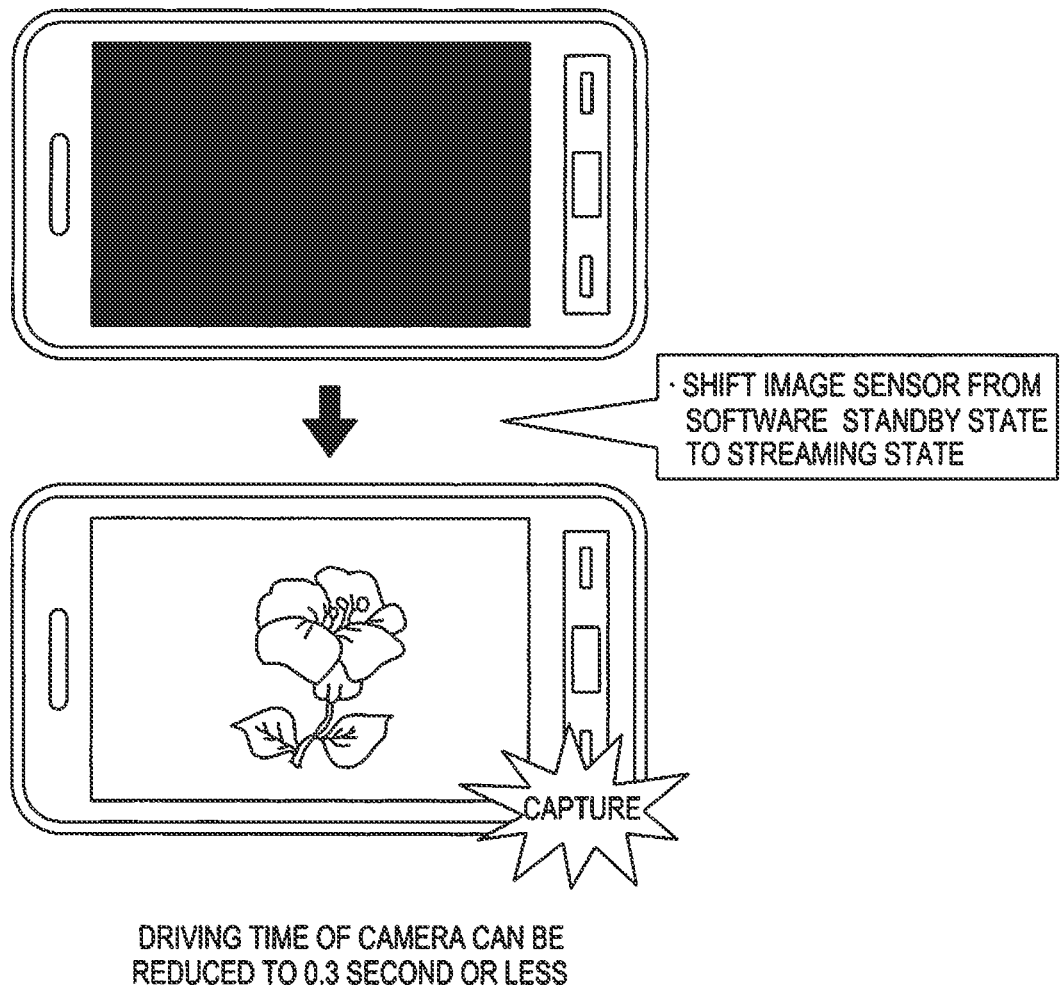
FIG. 5 illustrates the operation of a cellular phone according to an embodiment of the present invention.

FIG. 5 illustrates the application of the present invention to a cellular phone having a camera function. As compared with a normal camera operating manner, described with reference to FIG. 1, since the cellular phone, to which the present invention is applied, implements a low power standby state, it is possible to omit the processes of initializing the image sensor and loading a camera application program into a memory, which are necessary for driving a camera function in the existing camera, so that rapid photographing can be performed. Also, since the low power standby mode is implemented, it becomes possible to maintain a standby state for a long time.

While the invention has been shown and described with reference to certain embodiments thereof, it will be understood by those skilled in the art that various changes in form and details may be made therein without departing from the spirit and scope of the invention as defined by the appended claims. For example, when the mobile terminal is a mobile communication terminal, although a voice call is received in the software standby state, the software standby state may be maintained without any change when a continuous period of time of the standby mode is equal to or less than a threshold value. In other words, while performing the operations according to a call incoming and communication, the image sensor is maintained in the software standby state without any change. In this case, images according to a call incoming may be displayed on the display unit. Also, when the communication is terminated, the null image is again displayed on the display unit. When a visual communication call incomes in the software standby state, the image sensor may shift to the streaming state for visual communication.

Accordingly, the scope of the invention is not to be limited by the above embodiments but by the claims and the equivalents thereof.

What is claimed is:

1. A method comprising:
operating an image sensor, operatively coupled with an electronic device, in a first state based on a determination that the image sensor is to be operated in a low power mode; and
when the image sensor is operating in the first state:
preserving a setup value that determines a size and a quality of an image to be photographed in a photographing mode, and
refraining from outputting a stream of data from the image sensor,
wherein the image sensor is operating in the first state, the image sensor has initialized, and one or more setup values corresponding to the photographing mode have set up.

2. The method of claim 1, further comprising:
maintaining the image sensor in the first state when a call is received.

3. The method of claim 1, further comprising presenting a null image on a display operatively coupled with the electronic device.

4. The method of claim 3, wherein the null image corresponds to at least a part of a predetermined image.

5. The method of claim 3, wherein the null image corresponds to a black image.

6. The method of claim 3, wherein the null image is output at a minimum frame per second (FPS) value.

7. The method of claim 1, further comprising:
allowing the image sensor to operate in a second state so as to output the stream of data to display an image on a display operatively coupled with the electronic device.

8. An apparatus comprising:
an image sensor;
a display operatively coupled with the apparatus; and
a controller operatively coupled with the apparatus, the controller configured to:
operate an image sensor in a first state based on a determination that the image sensor is to be operated in a low power mode; and when the image sensor is operating in the first state:
  preserve a setup value that determines a size and a quality of an image to be photographed in a photographing mode, and
  refrain from outputting a stream of data from the image sensor,
wherein the controller is configured to set up the image sensor based on at least one of one or more setup values corresponding to the photographing mode.

9. The apparatus of claim 8, wherein the controller is further configured to present a null image on the display.

10. The apparatus of claim 8, wherein the controller is further configured to present one or more images according to an incoming call.

11. The apparatus of claim 8, wherein the controller is further configured to execute an application program in a background.

12. The apparatus as claim 8, wherein the first state is maintained when a call is received.

13. The apparatus as claim 8, wherein the controller is further configured to operate the image sensor in a second state when a visual call is received.

14. The apparatus as claim 8, wherein the controller is further configured to change an amount of power supplied to the image sensor in response to a function execution request.

15. The apparatus as claim 8, wherein the controller is further configured to omit at least one of one or more processes associated with initializing the image sensor to load an application program into a memory.

16. The apparatus as claim 8, wherein the controller is further configured to, when the image sensor is operating in the first state, periodically check for a user input.

17. A non-transitory machine-readable storage device storing instructions that, when executed by one or more processors, cause the one or more processors to perform operations comprising:
  operating an image sensor, operatively coupled with an electronic device, in a first state based on a determination that the image sensor is to be operated in a low power mode; and
  when the image sensor is operating in the first state:
  preserving a setup value that determines a size and a quality of an image to be photographed in a photographing mode, and
  refraining from outputting a stream of data from the image sensor,
  wherein the image sensor is operating in the first state, the image sensor has initialized, and one or more setup values corresponding to the photographing mode have set up.

* * * * *